United States Patent [19]

Jung

[11] 4,188,201
[45] Feb. 12, 1980

[54] APPARATUS FOR FORMING AN INGOT IN A ROTATING HOUSING

[76] Inventor: Lothar Jung, 32 Lurline Dr., Millington, N.J. 07946

[21] Appl. No.: 897,117

[22] Filed: Apr. 17, 1978

[51] Int. Cl.² .................. C03B 19/04; C03B 3/00; C03B 23/20
[52] U.S. Cl. ..................... 65/302; 65/335; 65/347; 65/DIG. 8
[58] Field of Search .............. 65/302, 335, DIG. 8, 65/18, 120, 136, DIG. 7, 347; 427/193

[56] References Cited

U.S. PATENT DOCUMENTS

| | | | |
|---|---|---|---|
| 1,368,990 | 2/1921 | Scharl | 65/72 |
| 1,463,513 | 7/1923 | Lee | 13/21 |
| 2,006,947 | 7/1935 | Ferguson | 65/335 X |
| 2,008,495 | 7/1935 | Ferguson | 65/347 X |
| 2,129,007 | 9/1938 | Kallingeta | 13/21 |
| 2,161,950 | 6/1939 | Christensen | 118/716 |
| 2,358,903 | 9/1944 | Zotos | 432/20 |
| 2,545,728 | 3/1951 | Everett | 65/110 |
| 2,834,157 | 5/1958 | Bowes | 65/335 X |
| 2,962,790 | 12/1960 | Daniel | 264/57 |
| 3,219,868 | 11/1965 | Mason et al. | 313/184 |
| 3,531,677 | 9/1970 | Loughridge | 313/112 |
| 3,853,520 | 12/1974 | Rau | 65/302 X |
| 3,902,885 | 9/1975 | Rau | 65/302 |
| 3,957,474 | 5/1976 | Kobayashi et al. | 65/3 A |
| 3,982,916 | 9/1976 | Miller | 65/18 X |
| 4,040,795 | 8/1977 | Jung | 65/DIG. 8 |

FOREIGN PATENT DOCUMENTS

| | | | |
|---|---|---|---|
| 18437 | of 1905 | United Kingdom | 65/DIG. 8 |
| 400020 | 10/1933 | United Kingdom | 65/DIG. 8 |
| 445592 | 4/1936 | United Kingdom | 65/DIG. 8 |
| 1003974 | 9/1965 | United Kingdom | 65/DIG. 8 |

Primary Examiner—S. Leon Bashore
Assistant Examiner—Frank W. Miga
Attorney, Agent, or Firm—Kenway & Jenney

[57] ABSTRACT

The apparatus for manufacturing an ingot includes a rotatable housing with an inner surface defining an opening therethrough along the rotational axis of the housing. The housing is rotated about the rotational axis. The housing includes a layer of insulating material located between the inner and outer surfaces of the housing. Particulate material is deposited along the inner surface while the housing is rotating and the particulate material is heated above its melting temperature while the housing is rotating, the rotational movement holding the molten particulate material in place by centrifugal force on the inner surface for forming an ingot.

The method of manufacturing an ingot includes the steps of rotating a housing having an inner surface which defines an opening therethrough, the housing containing a layer of insulating material between the housing outer surface and the inner surface, depositing particulate material across the inner surface, and heating the particulate material above its melting point, the rotational movement of the housing holding the molten particulate material by centrifugal force on the inner surface for forming an ingot.

22 Claims, 8 Drawing Figures

APPARATUS FOR FORMING AN INGOT IN A ROTATING HOUSING

BACKGROUND OF THE INVENTION

This invention relates to the manufacture of hollow ingots of fused quartz of the type which serve as the preform for the manufacture of high quality fused quartz or fused silica tubing.

In an older process, the manufacture of fused quartz tubing is accomplished without the production first of a preformed ingot. In this process, quartz material capable of being fused is filled into a vertical, high temperature refractory metal furnace and is gradually heated above the melting point of Cristobalite (1728° C.), above which only amorphous $SiO_2$ exists. The molten and soft material is then extruded at the bottom of the furnace while being shaped into a tube or rod depending on the type of orifice or die employed in the apparatus.

One major disadvantage of this process is that there is a severe limitation on the range of sizes of the tubes or rods which can be produced by this method. It is generally known that the maximum diameter of the tubing which can be produced is limited to a few inches, while many applications require tubing of significantly larger diameters.

Another limitation of this older process is the relatively low quality of the fused material, regardless of the grade of the fusing quartz material which is fed into the furnace. For example, it is known to those familiar with the art that such directly produced material is characterized by a comparatively high content of open and closed bubbles. Further, die marks often appear on the outside of tubes or rods and metal contamination frequently occurs due to the mutual exposure of the furnace lining with the molten quartz whenever the flow of inert gases is not closely enough controlled. However, the most severe limitation of this process is the lack of versatility of the apparatus with respect to the manufacture of different types of tubing and changes of dimensions during a single furnace run. Once the furnace is started up it must be operated around the clock until, sometimes after several weeks of continuously running the same size tubing, the expensive furnace lining has deteriorated to a point at which even a lower grade tubing or rod cannot be produced, thus finally warranting to shut down the furnace.

In order to overcome the limitations of this older process all large diameter tubing and higher quality small and medium diameter tubing are produced by using the following two steps: (1) a suitable preform of the fused material is developed in the form of a cylindrical ingot or billet and, (2) the ingot is drawn into a tube which offers a choice of different diameters, wall thicknesses and other characteristics. This method also permits the manufacture of small as well as large quantities through multiples of short furnace runs.

In an older two-step process which has many disadvantages a hollow ingot is produced by employing first an expensive high temperature refractory metal mandrel in a vertical or horizontal position, which is covered with expensive fused quartz tubing and protected by a flow of inert gases. After heating the rotating arrangement, fine crystalline quartz powder is then applied to the outer surface of the fused quartz tubing and layers of newly fused quartz are formed while both the gas burner and the powder feeder move along the tubing until the ingot is completed.

SUMMARY OF THE INVENTION

The problems and disadvantages described above in connection with the prior art processes for manufacturing fused quartz or fused silica tubing have been solved in accordance with the invention. A hollow cylindrical housing with an inner layer of granular and/or solid refractory-type material is rotated, the inner material being held in place by centrifugal force. A heating element and powder feeder are inserted through one end of the cylinder so that crystalline quartz powder can be distributed across the inner surface of the material and heated to form a hollow ingot as the housing is rotated.

The major disadvantages of using an expensive mandrel are that it often suffers damage beyond repair and frequently contaminates the melt if the flow of inert gases is not closely enough controlled. As can be seen, it is one objective of my invention to eliminate these disadvantages by not using a mandrel and to achieve an accurate and non-contaminated bore without tools.

Another disadvantage of the older method of forming a hollow ingot mentioned above is that significant losses of the crystalline quartz powder occur due to the counteraction of the rotation of the receiving surface and the application direction and velocity of the powder on the outer surface. It is, therefore, another objective of my invention to completely eliminate spray losses of the crystalline quartz powder and prevent the powder from being thrown off due to the counteraction of the rotation and the application direction of the powder.

Still another disadvantage of the aforementioned older method is the loss of heat which occurs when an outer surface of a cylinder is heated with flames. It is one more objective of my invention to eliminate this disadvantage by thermally shielding the heated surfaces upon which the crystalline powder is applied.

It is yet another disadvantage of the older process, that the application surface for the powder is severely limited in size. It follows that the larger the receiving surface of the ingot, the larger the total amount of material fused per time limit. Accordingly, the receiving surface of the fusing process which is the subject of this application has been maximized.

Since it is generally known that the drawing of an ingot may be performed at much greater speed than it can be grown, it is evident that many more fusing machines are employed in order to balance the capacity of the drawing equipment. It is therefore one more objective of my invention to achieve an improved balance between the fusing capacity of my machine and the available drawing machines.

These and other disadvantages of my invention will become apparent when detailed descriptions of several preferred embodiments of the invention are considered in conjunction with the drawings.

DETAILED DESCRIPTION OF SEVERAL PREFERRED EMBODIMENTS

Figure 1:
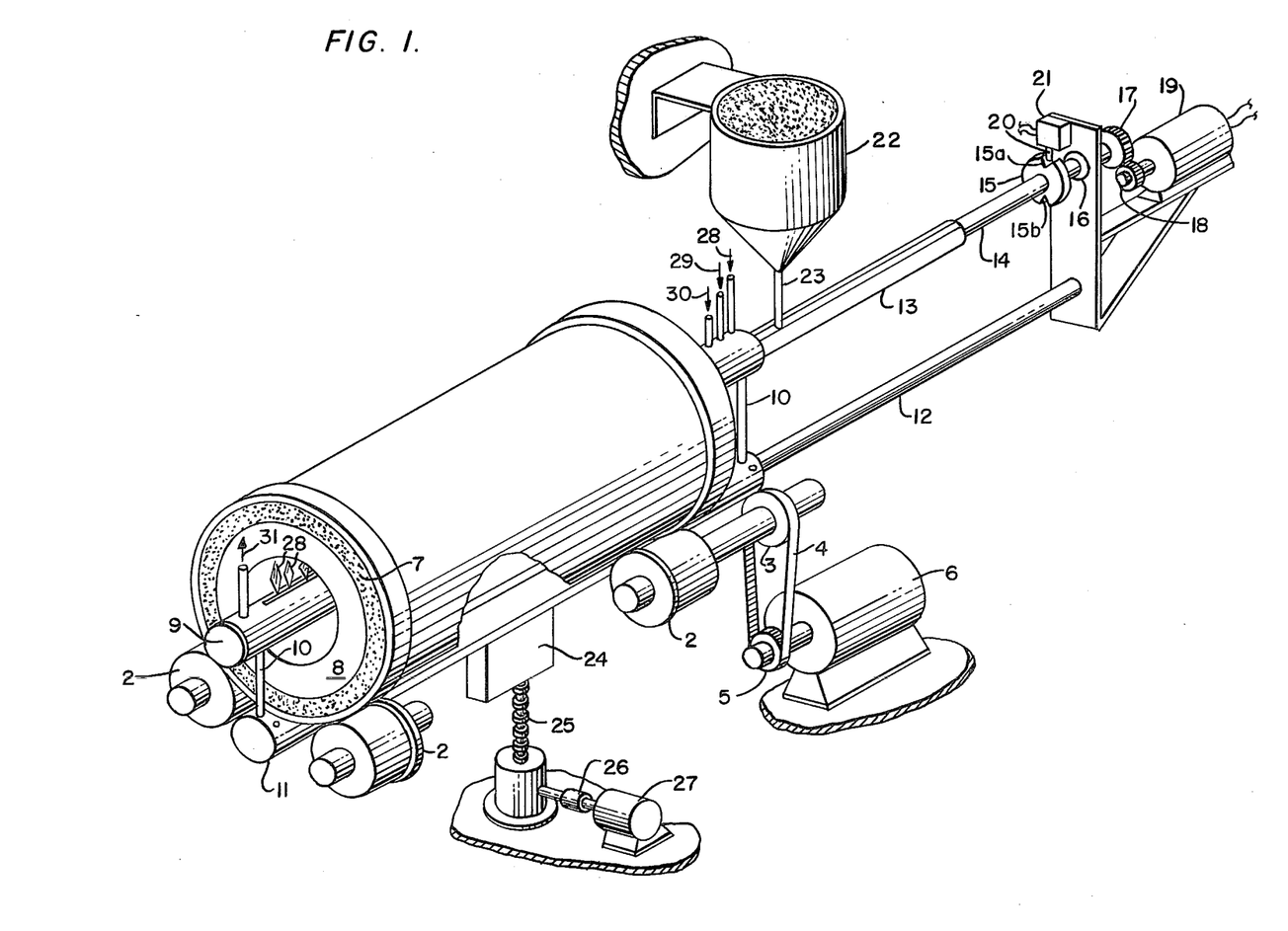
FIG. 1 is a perspective view of the apparatus in which the hollow ingot is produced.

Beginning with FIG. 1, reference numeral 1 is used to designate a cylindrical furnace housing, which may be comprised of a suitable metal, located on four cylindrical rollers 2. These rollers are attached to a frame not shown here for the sake of clarity.

Figures 2, 3:
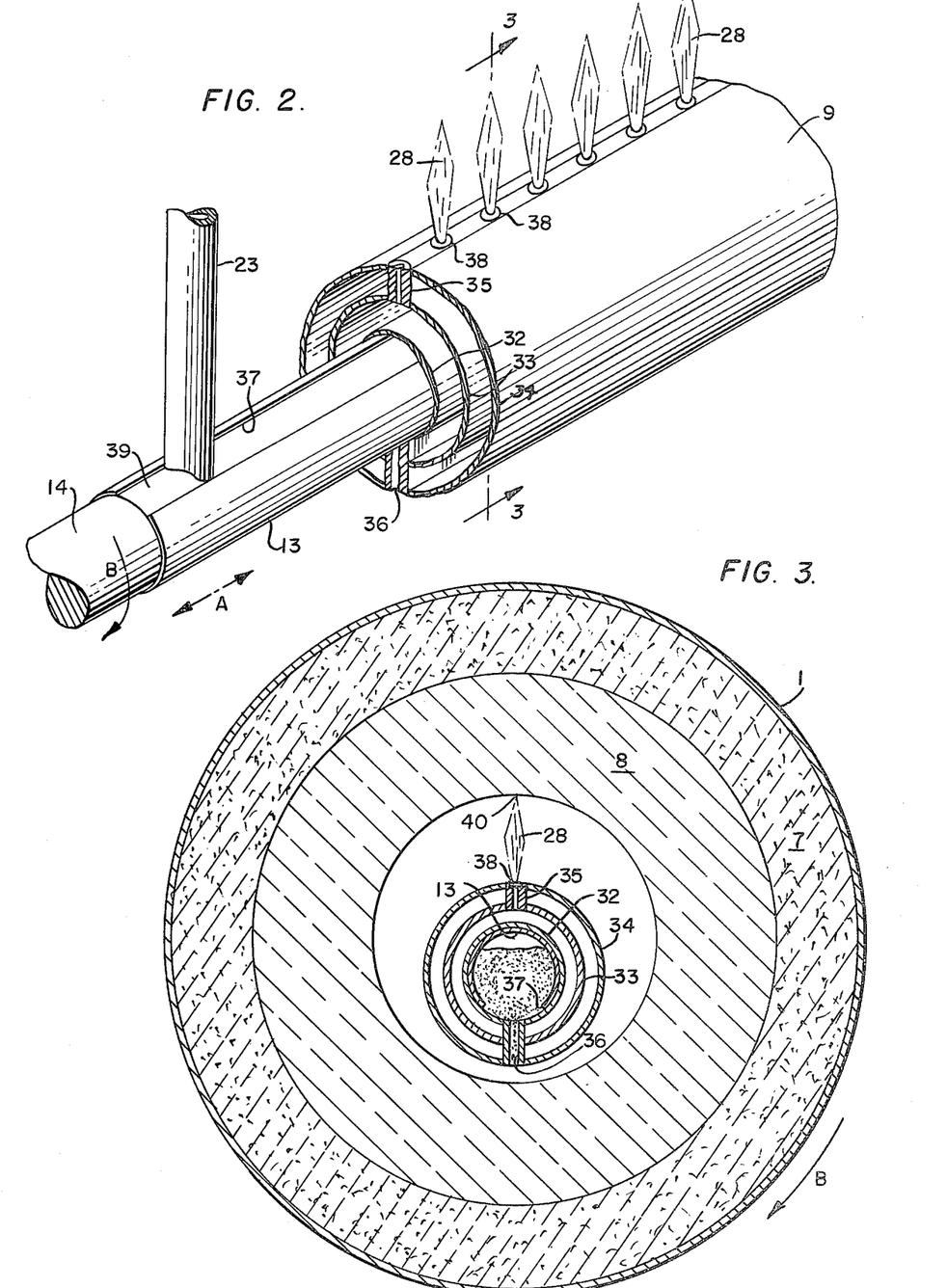
FIG. 2 is a perspective view partially in section of a combustion gas heating element and quartz powder feeder.
FIG. 3 is a cross-sectional view of the apparatus of FIG. 1 looking along the line 3—3 of FIG. 2, which includes the combustion gas heating element shown in FIG. 2.

The shaft of one of the four rollers is connected to a pully 3 and, through a belt 4, to still another pulley 5 which in turn is connected to the drive shaft of an electrical motor 6, thus providing for the transmission of energy to rotate the furnace housing sufficiently fast around its horizontal axis in the direction of the arrow A shown in FIG. 3.

A cylindrical layer of a granular and/or solid refractory type material with high temperature capability and poor thermal conductivity designated by reference numeral 7 is held in place by the centrifugal force caused by the rotation of the housing. A hollow ingot 8 is shown extending inwardly toward the center of the housing. The remaining space in the center of the hollow ingot 8 contains an elongated combustion gas heating element 9.

The heating element 9 in turn is suspended in a stationary position by way of two cylindrical holders 10 on the outer body of an air of fluid operated cylinder 11, located outside and directly underneath the rotating furnace housing. Extending from the body of the air or fluid operated cylinder 11 is a piston rod 12 which serves in turn as a holder for a powder feeder device 13.

The powder feeder device 13 includes a longitudinally split tube 13 which is exactly fitted to the inner diameter of the hollow heating element 9, whose end section is attached to a solid rod 14. The rod 14 in turn is rigidly fastened to a disc 15, through a rotatable bearing 16, and finally ends in a sprocket 17. Another sprocket 18, mounted on the drive shaft of the electrical motor 19, suitably engages the sprocket 17.

A special feature of the disc 15, as shown in FIG. 1, is to provide two opposed indentations 15a and 15b on its circumference for the purpose of defining two exact positions, when the pin 20 of the solenoid 21 engages in them.

A container of fusing quartz powder 22, which includes a nozzle 23, rests suitably suspended over the open slot of the powder feed tube 13.

The entire arrangement is supported by a plate 24 attached to the body of the cylinder 11. A spindle drive 25 combined with a coupling 26 and an electrically operated motor 27 has been provided in order to focus the flames 28 of the heating element onto the inner surface of the hollow fused quartz ingot 8.

The heating element 9 includes inlet ports 28 and 29 for the combustion gases and inlet port 30 for cooling water which is drawn off at the exit port 31 at the other end of the unit.

Referring now to FIGS. 2 and 3, the elongated heating element 9 and powder feeder tube 13 are shown in greater detail.

For the sake of clarity FIG. 2 shows the heating element 9 in a partially sectioned view. Two separated and sealed annular spaces can be seen: (1) a combustion gas chamber defined by tubes 32 and 33 and (2) a cooling water chamber defined by tubes 33 and 34. The combustion gas chamber communicates with the open atmosphere through the exit orifices 38 of the flames 28 provided in a connection bar 35. The slot 37 of the powder feeder tube 13 is connected with the outer atmosphere by way of the slotted distance bar 36 when the feeder tube 13 is rotated to be upside down.

In order to fill quartz powder into the feeder tube 13 and charge the furnace, an empty feeder tube 13 is completely removed from the interior of the elongated heating element 9 and suitably exposed to the quartz powder feeder nozzle 23 which is connected to a container 22 as shown in FIG. 1. Quartz powder is fed by gravity into an open slot 37 of the feeder tube 13 and will run off under the angle of repose 39, which is typical for the type of powder used.

With the aid of the air or fluid operated cylinder 11 described in conjunction with FIG. 1, the powder feeder tube 13 is moved to the inside of tube 32 and into the inner space of the heating element 9, as shown by the arrow A, (FIG. 2) at the same time the feed tube 13 is being loaded with fusing quartz powder. Toward the end of the travel of the feeder tube 13 the filling is terminated when the solid section 14 of the tube 13 travels underneath the powder nozzle 23 and is sealed off.

Next, the drive motor 19 shown in FIG. 1 begins to rotate the feeder tube 13 in the direction of the arrow B, (FIG. 2) within the elongated gas burner element 9 until the slot 37 is directly over the discharge slot 36 as shown in FIG. 3. In this position the motor 19 will be interrupted by the solenoid 21 when the pin 20 engages the indent 15b on the disc 15, causing the feeder 13 to be locked into position. After the quartz powder has been slowly discharged through the slot 36 and fused onto the rotating surface of the ingot 8, the solenoid will be actuated by a timing device (not shown).

Next, the feeder tube 13 rotates back into the upright starting position and upon reaching this position is held again by the pin 20 engaging the indent 15a in the disc 15.

Now the linear motion of the feeder pipe is started up by the air or fluid operated cylinder 11 FIG. 1 which is also actuated by the timing device mentioned above.

The tube 13 is withdrawn from the elongated heating element 9 and quartz powder begins to charge through the slot 37 after the nozzle 23 has been freed from the sealing rod 14. From here on the process repeats itself for as many times as required for the completion of one ingot.

FIG. 3 also shows the layer of granular and/or solid refractory material 7 on which the ingot 8 is fused. As also shown, it is preferable to focus the flames 28 onto the deposited surfaces at the point indicated by reference numeral 40 to maximize the heating capability of the apparatus, which is accomplished by means of the spindle drive 25 and motor 27 raising and lowering the cylinder 13.

Figure 4:
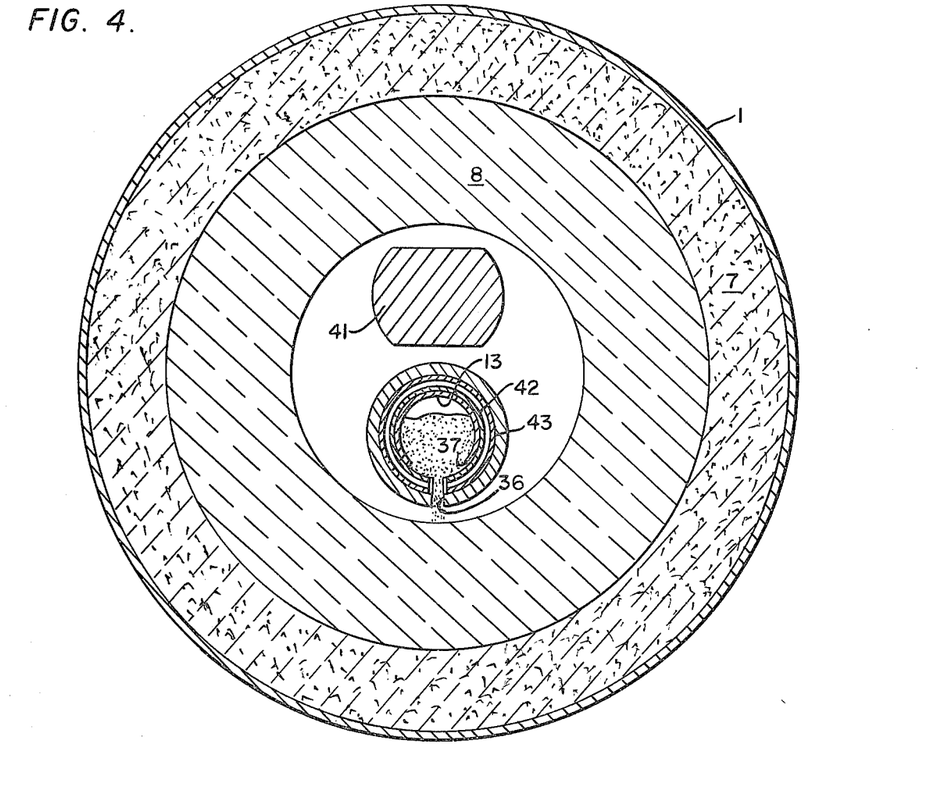
FIG. 4 is a cross-sectional view similar to FIG. 3, but showing another embodiment of the invention where an electrically heated element is used along with a suitable powder feeder.
Figure 5:
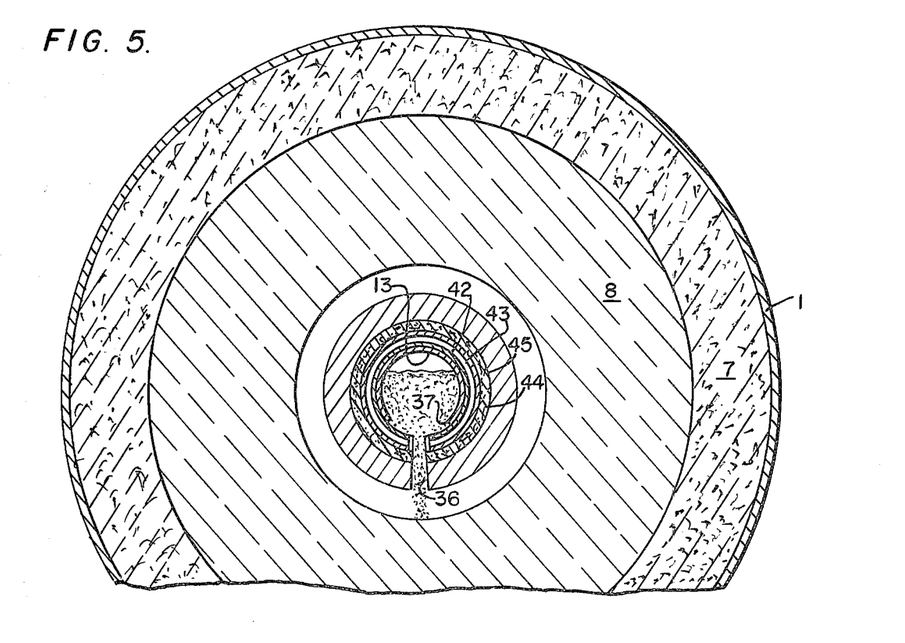
FIG. 5 is a cross-sectional view similar to FIG. 4, but showing another type of electrically heated element.

Alternative apparatus for forming the ingot 8 are shown in FIGS. 4 and 5. First, referring to FIG. 4, the silica powder is deposited through an opening 36 onto the inner surface of the revolving ingot 8 as described above, the powder being introduced through the slot 37 of the powder feeding tube 13 as shown in FIGS. 1 and 2. In this embodiment, however, instead of heating the ingot by means of a gas flame, a heating element 41 is provided which projects through the housing 1 parallel to the heating tube 13. The heating element 41 can be a rod of any suitable shape and be formed of a suitable material such as a graphite.

In order to prevent the fusing quartz powder from melting prematurely in the tube 13, a cooling water chamber is provided which is defined by the tubes 42 and 43 similar to the one provided in the embodiment shown in FIGS. 1-3. An insulating layer 44 formed of, for example, a graphite tube provides additional insulating on the outer surface of the cooling water chamber.

A second alternative embodiment is shown in FIG. 5 where instead of providing a heating element 41 separate from the feeder tube 13, the heating element is formed concentric with the feeder tube 13. The feeder tube 13 is provided with a slot 37 through which fusing quartz powder falls by gravity through the opening 36 and onto the ingot 8. Similar to the embodiment shown in FIG. 4, a water cooling jacket is provided between the tubes 42 and 43 adjacent to the feeder tube 13. The heating element surrounds the water cooling chamber and is designated by reference numeral 45, the heating element 45 being separated from the water cooling chamber by an insulating layer 44 formed of, for example, a material such as carbon or graphite felt.

When an electrical heating element such as those shown in FIGS. 4 and 5 is used, an optical quality hydroxylfree fused quartz material can be produced. This can be done either by forming the ingot under a vacuum or by circulating a dry inert gas through the housing while the ingot is being formed.

Figure 6:
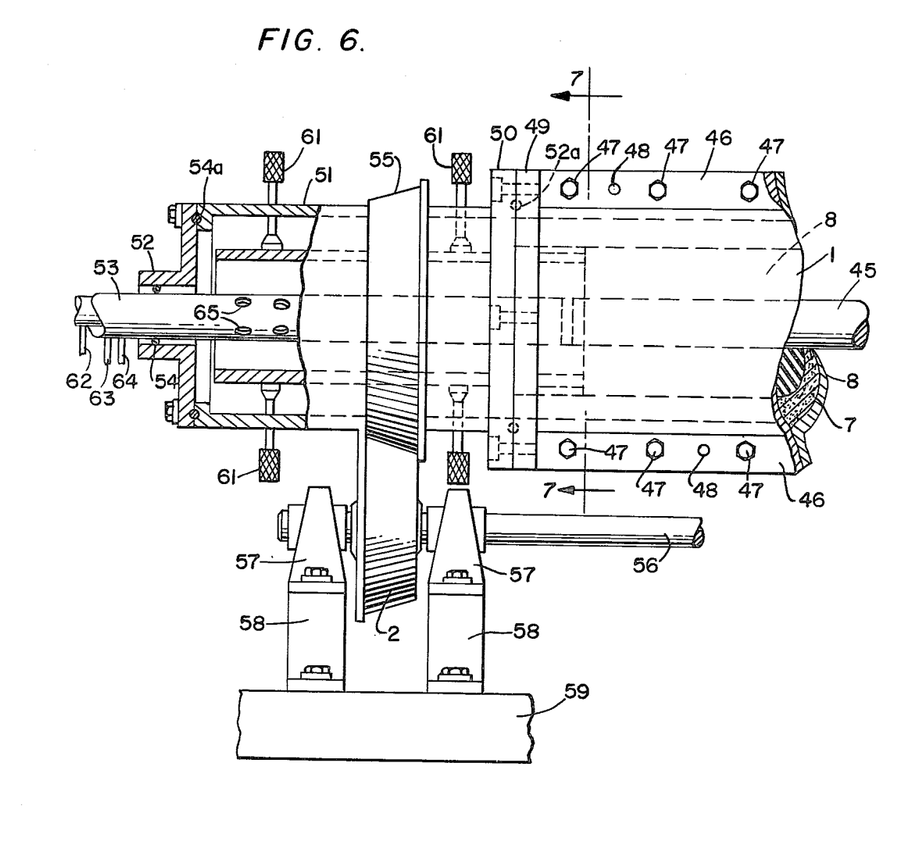
FIG. 6 is a front plan view, partially in section, which shows the embodiment of FIG. 5 provided with a vacuum-tight enclosure and a holder for the ingot.
Figure 7:
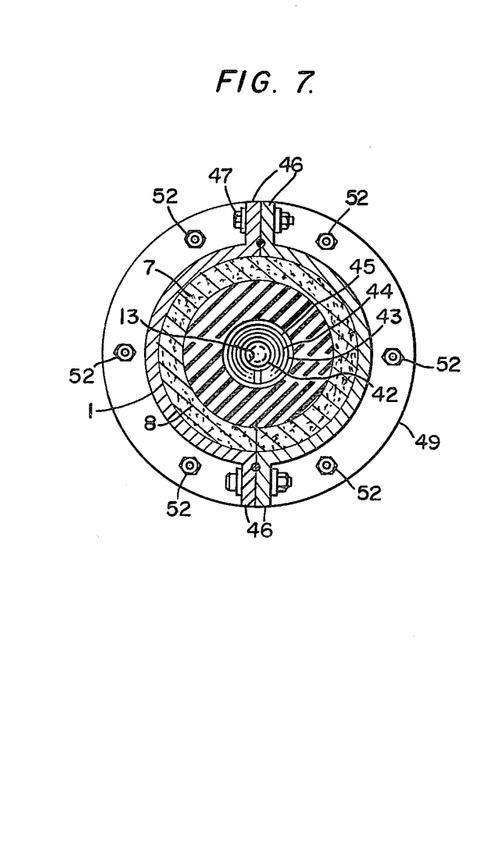
FIG. 7 is a cross-sectional view looking along the line 7—7 of FIG. 6.

FIGS. 6 and 7 show the structure of a vacuum-tight housing for use with the embodiment of the electrical heating element shown in FIG. 5. Referring to FIGS. 6 and 7, the cylindrical furnace housing 1 is split into two separate housing portions, each of which is provided with a pair of linear flanges 46 which are connected by screws 47. Locating pins 48 are provided for proper alignment.

The housing 1 also includes a circular flange 49 which connects with a circular flange 50 connected to an extension of the housing 1 designated by reference numeral 51. The circular flanges 49 and 50 are connected by screws 52 and a vacuum-tight connection maintained by an O-ring 52a. The other side of the housing extension 51 is formed of an end plate with a seal-through vacuum flange 52 which is connected to a water cooled feed-through electrode holder 53 by means of an O-ring seal 54. If a high temperature refractory material is used for the electrode holder 53, the water jacket can be eliminated. A vacuum-tight connection between the housing extension 51 and end plate is maintained by an O-ring 54a. This type of seal-through flange, for example, can be of the type shown and described in U.S. Pat. Nos. 3,895,174, 3,674,904 and 3,652,245. The electrode holder 53 is formed of a conductive material such as copper for conducting electricity to the heating element 45 and remains stationary along with the heating element while the housing 1 and housing extension 51 are rotated.

As shown in FIG. 6, a race collar 55 is mounted on the housing extension 51 in a position to engage the roller 2. A drive shaft 56, which is supported by a pillow block 57, support 58 and frame 59, rotates the roller 2 and housing 1 through the race collar 54 for performing the ingot fusing operation describe above.

A cylindrical holder 60 is located inside the housing extension 51, which is formed of fused quartz or fused silica. The holder is maintained in place by means of a plurality of set screws 61. The holder has a diameter equal to or smaller than that of the ingot and can be formed of a lower quality raw silica sand by the same or another process. The wall thickness of the holder depends on the physical strength required. The holder projects into the housing 1 as shown in FIG. 6 so that it becomes fused to the end of the ingot when the latter is formed as described above. The holder is used to hold the ingot for subsequent redrawing and/or reshaping.

In the embodiment shown in FIG. 6, when a vacuum is maintained inside the housing 1 it can be applied at the inlet 62 while cooling water is injected through the inlet 63, circulated as described above and exhausted through the outlet 64. Alternatively, an inert gas such as nitrogen or argon can be circulated in place of the vacuum by introducing it through the inlet 62 and exhausting it through the outlet openings 65. When inert gas is used the seal-through flanges 52 can be eliminated, the circulating gas preventing moisture from reaching the interior of the rotating housing.

Figure 8:
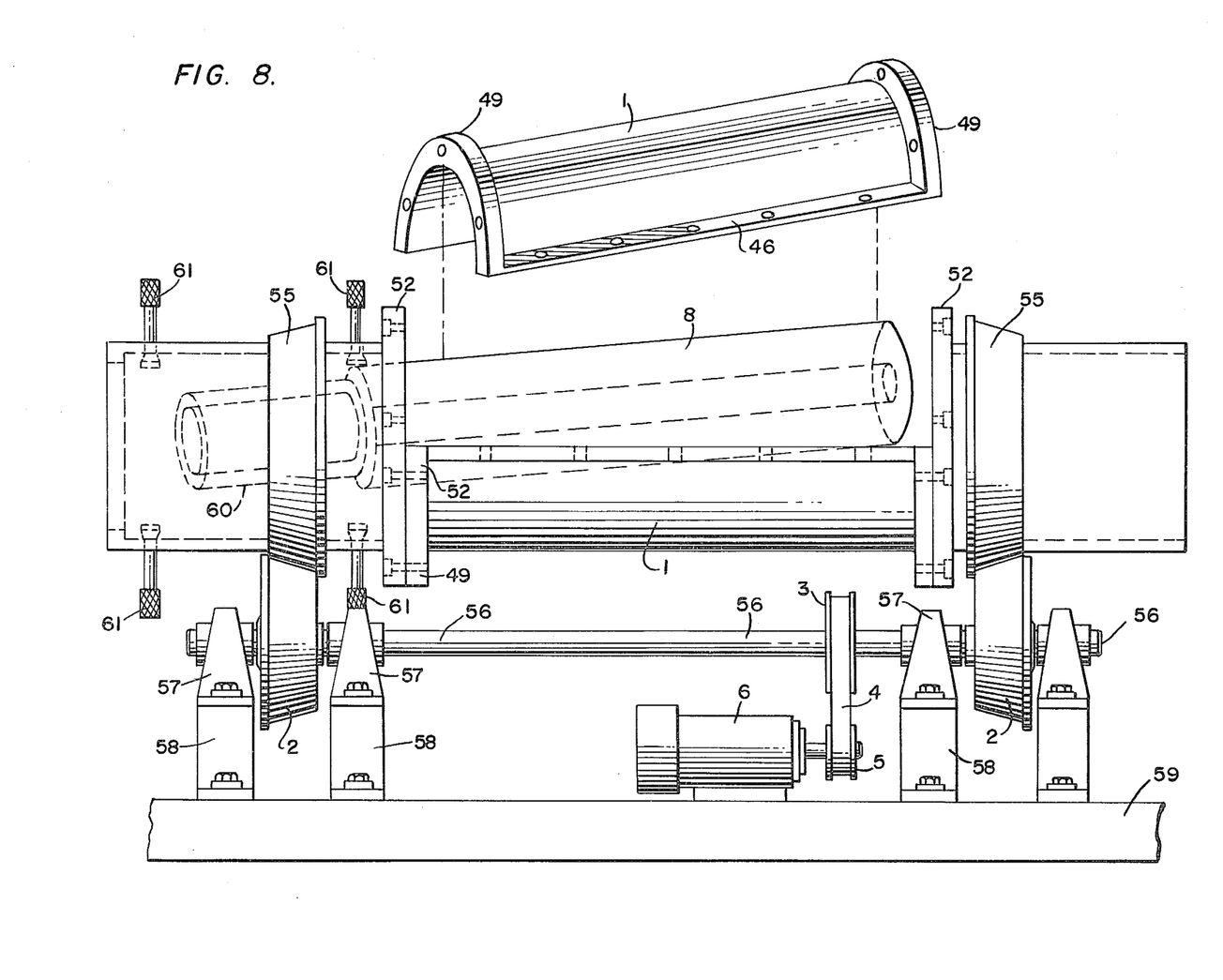
FIG. 8 is a front plan view of the embodiment shown in FIGS. 6 and 7, illustrating in particular how a formed ingot can be removed from the apparatus.

FIG. 8 illustrates how a formed ingot can be withdrawn from the apparatus shown in FIGS. 6 and 7. The linear flanges 46 are disconnected and one of the housing portions is removed as shown. The set screws 61 which hold the holder 60 in place are loosened and the central heating and powder feeding mechanism is withdrawn as described in conjunction with FIG. 1. The ingot 8 is lifted out of the housing so that subsequent conventional operations can be performed on it such as, for example, transferring it to an arc-heating rotary furnace for remelting to conform the ingot to the shape of a mold or by drawing or machining the ingot. If the insulating material is granular in form, it can be removed, for example, by picking it up with a vacuum. If the material is in the form of a solid refractory tube, it can be split and the separate portions listed out before the ingot is removed.

The material used to form the ingot, for example, can be silica sand or quartz powder, which can be doped or chemically treated to change the optical and/or chemical properties of the ingot product. One way of treating the material is by coating the grains with, for example, a commonly known doping or alloying compound such as titanium dioxide, cerium dioxide, or sodium or chloride compounds, etc. Alternatively, the silica sand or quartz powder may be physically admixed with one or more of the aforementioned additives to provide a mixed feed. In this manner ingots of quartz alloyed with such compounds may be produced.

In this way, a hollow cylindrical fused quartz ingot of high purity can be formed without the need to use an expensive mandrel which can be damaged or contaminate the melted quartz. Further, all of the fusing quartz powder which is sprinkled onto the ingot is used to eliminate any undue waste. The apparatus and method are very efficient since heat is applied directly to the portion of the ingot on which the fusing quartz powder is deposited with no insulating or thermal shielding. In this way superheating of the melt is avoided since heat is not transferred through the melt (as required by the aforementioned U.S. Pat. Nos. 3,895,174, 3,674,904 and 3,652,245). Since the receiving surface of the ingot is relatively large there is maximum efficiency in forming the ingot.

It should be understood that those with ordinary skill in the art will be able to make improvements and modifications to the invention described in this application and all such improvements and modifications are contemplated as falling within the scope of the appended claims.

I claim:

1. An apparatus for manufacturing an ingot from a particulate ingot-forming material comprising:
    (a) a housing mounted for rotation in a generally horizontal plane about a central axis, said housing defining an interior surface for receiving the particulate material and supporting the ingot formed from same;
    (b) means for rotating the housing about its central axis at a speed sufficient to hold the particulate material against the interior surface by centrifugal force;
    (c) means for depositing the particulate material by gravity onto the interior surface of said housing, said depositing means including an elongated hollow feeder tube having a slot or opening along its length for receiving and releasing the particulate material;
    (d) means for introducing particulate material into the tube through the slot;
    (e) means for selectively moving the tube into the housing interior with the slot in the uppermost position;
    (f) means for rotating the tube until the slot reaches the lowermost position for discharge of the particulate material along the length of the housing interior; and
    (g) heating means coextensive with the fully inserted feeder tube, said heating means arranged to melt the particulate material clinging to the interior surface of said housing as that clinging material is rotated to the uppermost position.

2. The apparatus of claim 1, wherein the housing is cylindrical in shape.

3. The apparatus of claim 1, wherein the interior surface of said housing is defined by a layer of granular refractory material held in place by centrifugal force.

4. The apparatus of claim 1, wherein the means for rotating the housing includes engaging means for engaging an outer surface portion of the housing, and drive means for causing the engaging means to rotate the housing.

5. The apparatus of claim 1, wherein the means for moving the tube includes a hydraulically operated cylinder located outside the housing and connected to one end of the tube.

6. The apparatus of claim 5, wherein the cylinder is arranged parallel and below the tube and is connected to the tube through a bracket which supports the means for rotating the tube.

7. The apparatus of claim 1, wherein the means for introducing particulate material into the tube includes a stationary hopper which includes a nozzle communicating with the opening of the tube for depositing particulate material in the tube as it is moving into the housing interior, the tube including a stop means positioned to stop the material from flowing through the nozzle when the tube is filled.

8. The apparatus of claim 1, wherein the heating means includes a gas flame heating element extending along the length of the housing interior.

9. The apparatus of claim 1, wherein the heating means includes an electric resistance heating element extending along the length of the housing interior.

10. The apparatus of claim 1, wherein the heating means includes inner, middle and outer stationary tubes concentric with each other and with the feeder tube and extending along the length of the housing interior, the feeder tube and inner concentric tube being sized so that the feeder tube can slidingly engage and move relative to the inner tube, the inner and middle concentric tubes forming a cooling chamber, means for circulating a cooling fluid through said cooling chamber, the middle and outer concentric tubes forming a gas chamber, the outer tube having a plurality of openings along the length thereof for forming a gas flame, means for supplying a combustible gas to the gas chamber, the concentric tubes having a slot in the bottom portion and along their length for cooperating with the opening in the feeder tube so that when the feeder tube is rotated the particulate matter can fall by gravity through said slot.

11. The apparatus of claim 10, and further including means for regulating the height of the heating means relative to said housing inner surface.

12. The apparatus of claim 11, wherein regulating means includes means for raising or lowering the means for moving the feeder tube.

13. The apparatus of claim 1, wherein the heating means includes a stationary electric resistance heating means projecting through said housing interior parallel to the feeder tube, the feeder tube including insulating means around its outer surface.

14. The apparatus of claim 13, wherein the insulating means includes a chamber through which cooling fluid can be circulated adjacent to the feeder tube and an outer layer of insulating material.

15. The apparatus of claim 1, wherein the heating means includes a stationary electric resistance heating means around the feeder means when the latter is inside the housing interior, insulating means separating the feeder tube and heating means.

16. The apparatus of claim 15, wherein the insulating means includes a chamber through which cooling fluid can be circulated and a layer of insulating material between the chamber and heating means.

17. The apparatus of claim 1 or 17, wherein the housing includes means for maintaining the housing substantially vacuum tight.

18. The apparatus of claim 1 or 17, wherein the housing includes means for circulating an inert gas through the housing.

19. The apparatus of claim 1, wherein the housing includes two housing portions releasably connected to each other so that a finished ingot can be removed from the housing by removing at least one of said portions.

20. The apparatus of claim 1, and further including a housing extension portion connected at one end of the housing, an ingot holder positioned in the extension portion and projecting into the housing so that when the ingot is being formed it will fuse to the holder, and means for releasably maintaining the holder in place.

21. The apparatus of claim 1, wherein the layer of insulating material includes a tube formed of a refractory material the inner surface of the tube defining the inner surface of the housing, the tube being separable into at least two portions for facilitating removal of the formed ingot.

22. The apparatus of claim 1 wherein the means for moving the tube (e) and the means for introducing particulate material into the tube (d) cooperate so that the tube is charged with the particulate material as it moves longitudinally.

* * * * *